United States Patent [19]

Johnson

[11] 4,087,697

[45] May 2, 1978

[54] RAPID POWER TRANSFER SYSTEM

[75] Inventor: Robert W. Johnson, Levittown, Pa.

[73] Assignee: ESB Incorporated, Philadelphia, Pa.

[21] Appl. No.: 728,863

[22] Filed: Oct. 1, 1976

[51] Int. Cl.² .......................... H02J 7/00; H02J 9/00
[52] U.S. Cl. ..................................... 307/66; 307/87; 307/252 B
[58] Field of Search .................. 307/64, 66, 85, 86, 307/87, 252 B, 252 C, 252 T, 252 M; 361/4

[56] References Cited

U.S. PATENT DOCUMENTS

| | | | |
|---|---|---|---|
| 3,229,111 | 1/1966 | Schumacher et al. | 307/66 |
| 3,629,613 | 12/1971 | Feige | 307/252 T |
| 3,662,182 | 5/1972 | Ullmann et al. | 307/64 |
| 3,745,365 | 7/1973 | Spreadbury et al. | 307/64 |
| 3,805,139 | 4/1974 | Hoffmann, Jr. et al. | 307/66 |
| 3,909,621 | 9/1975 | Nollace et al. | 307/64 |

*Primary Examiner*—Robert K. Schaefer
*Assistant Examiner*—Eugene S. Indyk
*Attorney, Agent, or Firm*—Gary V. Pack; Anthony J. Rossi; Gilbert W. Rudman

[57] ABSTRACT

A system for rapidly substituting one source of AC power for another. A solid-state gated electronic valve is coupled in circuit with a principal power source or "line" and the current through the valve is monitored. Line voltage is also monitored and a timing signal produced to keep the system in synchronism with the principal power source. When the source voltage decreases or changes abruptly, or if its phase drifts unacceptably, the difference detected between the source and a reference effects the termination of valve gating signals, and allows the application of synchronous enabling signals to a standby power source. If the solid-state valve is non-conducting the standby source starts immediately in synchronism with the previously-supplied load voltage. If current is flowing in the valve, however, a commutating signal is produced which overrides the synchronous standby enabling signal to energize the standby power source with the proper polarity to extinguish current through the valve. When the current decreases below the holding current value the standby source is caused to enter the synchronous mode.

20 Claims, 2 Drawing Figures

RAPID POWER TRANSFER SYSTEM

BACKGROUND OF THE INVENTION

The present invention relates to controls for electric power sources, and more particularly to a control system for substituting one source for another within an extremely short period of time.

With many types of electrical and electronic apparatus it is necessary that the apparatus remain in an energized state despite the failure of a regular power source. For this reason a number of systems have been devised for producing emergency or standby power in the event of the failure of the principal power source. Such systems as presently known generally fall into two categories.

In the first category, which may be termed "uninterruptible" supply system, a load is supplied directly through the "standby" source, which may for instance be an inverter powered by a battery. The principal or "line" power source constantly charges the battery through a primary (first) rectifier which supplies power to the inverter for energizing the load. When a failure of the principal source occurs power continues to flow from the battery into the inverter, so that no interruption of power to the load is experienced. Of course, after some period of time the battery becomes discharged inasmuch as it is no longer receiving charging current from the outside source. Although the so-called uninterruptible type of power supply ordinarily performs well, it is uneconomical for many installations inasmuch as the primary rectifier system must be large enough to supply all of the power needed by a load under all circumstances, and moreover must be constructed to provide extremely high reliability and durability inasmuch as the "standby" system must operate continuously and if not sufficiently durable can itself be a source of failure.

A second and less expensive approach to providing an alternative power supply is to provide a battery-operated "standby" system which does not operate until the principal power source fails. Typically, a small charging system is provided to keep the battery of the system fully charged. A sensor, relay or the like is coupled in circuit with the principal or "line" power source so that when the principal source fails the standby inverter is immediately energized. Unfortunately, while the latter approach is comparatively economical and straightforward, the switchover procedure which it necessitates causes interruptions in the continuity of power flow which are, for some types of loads, extremely significant.

With the increasing use of computers and other data processing machinery having electrically-energized memories or registers in which data is stored, assuring a continuity of supplied power is extremely important. Also of particular interest are lighting systems incorporating high intensity discharge (hereinafter (HID) lamps. Lamps of this type consideration commonly comprise an envelope filled with a vapor of mercury, sodium, or one or more metal halides which ionize in the presence of a current flow and produce illumination. Since their inception HID lamps have become increasingly popular, both for their lighting characteristics and for their high lumens per watt rating, which makes them relatively economical to operate.

While it is often desirable to use HID lamps for indoor lighting, and particularly in commercial buildings, modern lighting codes commonly require the presence of standby or emergency power sources to assure continued illumination in the face of power failures.

Unfortunately, while HID lamps are in most respects well suited for use in populated structures, once they have been extinguished they must either be allowed to cool for a period of approximately 15 or 20 minutes, or else an inordinately high voltage is required to relight them. The voltage required is such as to make it impractical to provide standby power sources capable of producing the necessary voltage. To make matters worse, HID lamps will commonly become extinguished within approximately 4 milliseconds after a power supply failure, depending upon the specific type of lamp and the nature of the vapor. The quenching time of the HID lamps is far more rapid than the operation of the switching means which are conventionally utilized in transferring power from an outside source to a standby unit. Accordingly, it will be appreciated that it would be highly desirable to provide a rapid transfer system which maintains the effective continuity of power flow to a load, obviating any detrimental effects on the load.

It is therefore an object of the present invention to provide a power transfer system which operates substantially faster than any prior art system.

It is another object to provide a transfer system which will effectively maintain the continuity of supplied power while providing isolation from a defective power source and enabling a localized standby power source.

Still another object is to provide an improved rapid power transfer system.

Another object is to provide a rapid transfer system which will maintain the illumination of HID lamps while decoupling the load from the principal power supply.

SUMMARY OF THE INVENTION

Briefly stated, in accordance with one aspect of the invention the foregoing objects are achieved by providing a solid-state valve in circuit with a principal power supply, and means for detecting current flow through the valve. Other, line sensing means provide an indication of the phase voltage and frequency of the line and control the operation of a timing stage which provides signals to a gating control means and a reference means. The reference means produces a reference voltage in synchronism with line voltage, thus providing a basis of comparison so that when line voltage declines or changes abruptly with respect to the reference level a transfer signal is produced for enabling a standby power source.

Signals from the timing means allow the standby source to come on line in synchronism with the previously-detected line voltage. The current sensor associated with the electronic valve means produces a signal indicative of the presence and direction of current through the valve. The polarity with which the standby power system is first enabled is controlled as a function of the direction of current flow through the valve, so that the standby unit immediately gives rise to a voltage which opposes the valve current flow. After the valve is commutated the operation of the standby source is determined solely by the synchronous gating control, which remains in operation until line power has been restored.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

BRIEF DESCRIPTION OF A PREFERRED EMBODIMENT

Figure 1:
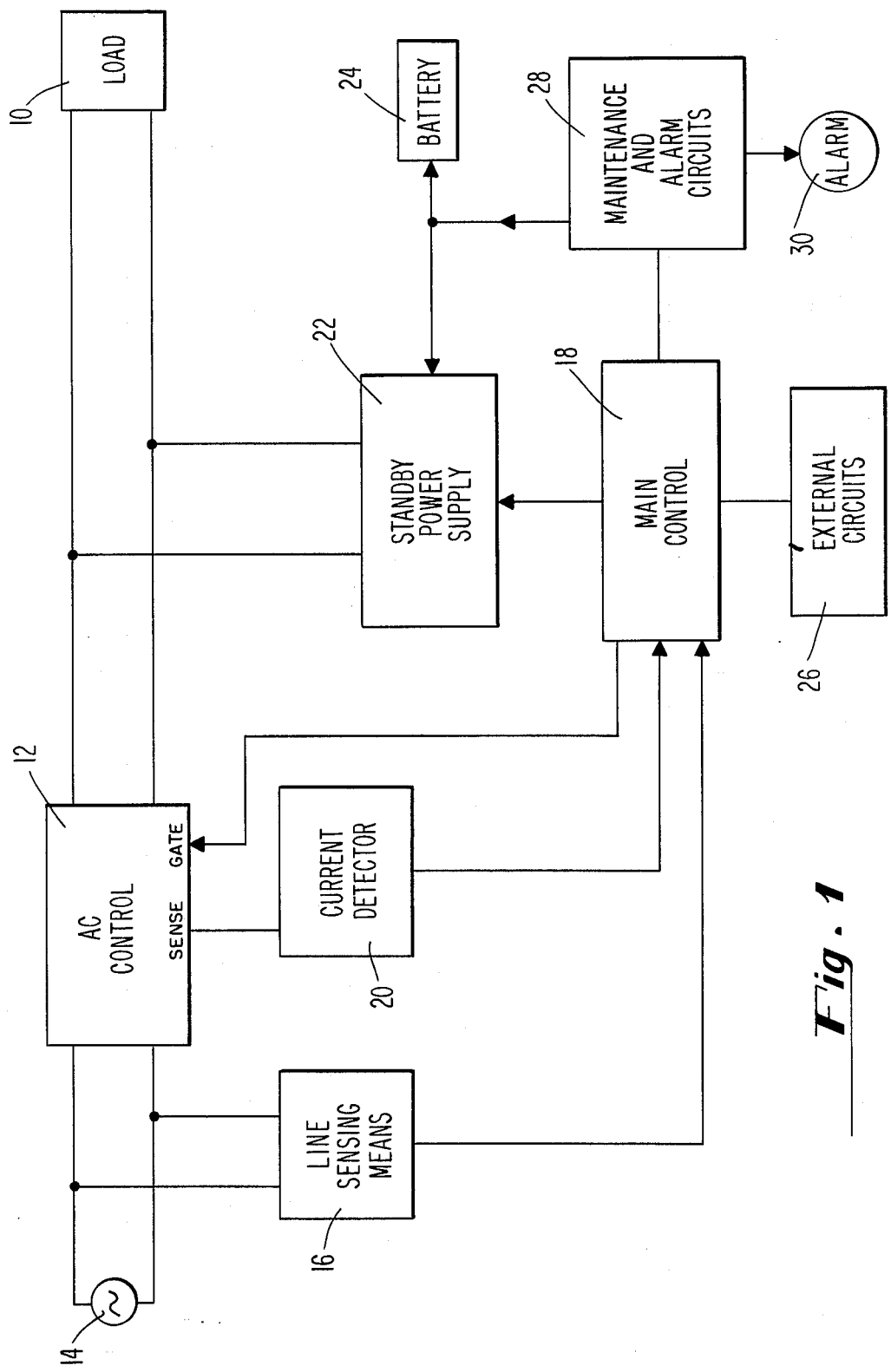
FIG. 1 is an idealized functional diagram of the present invention.

A load 10, to which it is desired to provide a substantially uninterruptible flow of power, is coupled by way of an AC controlling means 12 to a source of line power 14 which may, for example, represent a distant power station or the like. Line sensing means 16 is coupled to the power supply lines and outputs a signal representative of line voltage to a main control 18. The main control also receives a signal from a current sensor 20 which indicates the sense of current flowing through the AC controlling means, which may comprise a solid-state gated electronic valve. The main control outputs a GATE signal to the AC controlling means for enabling the solid-state valve to allow power to flow to load 10.

A standby power supply 22 is energized by a battery 24, and its operation is controlled by the main control 18. External circuits 26 of a conventional nature are provided in conjunction with the main control so that the main control may be operated or disabled by stimuli other than those derived from the line sensing means or current sensor and may, by way of example, comprise a simple cut-off switch for manually disabling the standby power function.

As is conventional with battery-operated standby power circuits, maintenance and alarm circuits 28 are provided in conjunction with the standby supply and the battery serve principally to maintain battery 24 in a fully charged state, and to give warning, by way of an alarm 30, of a degradation in the condition of the battery. Further, the circuits 28 may also serve to control or limit current flow from or to battery 24. It is considered that external circuits 26, alarm 30, and maintenance and alarm circuits 28 are of the type ordinarily used in conjunction with the battery-powered standby supplies, and thus familiar to those skilled in the art. Inasmuch as such systems are commonly understood and their design straight-forward, the details of their construction will not be discussed.

Turning to AC controlling means 12, it is recognized that with some types of line failures it is necessary to decouple the load from the line before engaging the standby power supply. Such an instance arises when a stoppage of power occurs while many other loads are coupled to the line. In such a situation, the line appears as a short circuit across load 10, making it impossible to supply adequate power by means of the standby power supply. Similarly when a "brownout" or reduction in voltage occurs, it is necessary to decouple the load from the line so that the load supply voltage can be increased.

Ordinarily, the load and/or the standby power supply is coupled to the outside source (line) by means of a transformer. Moreover, rapid decoupling of the load from the line is best effected by electronic valve means such as triacs (silicon controlled bilateral switches) or silicon controlled rectifiers (hereinafter SCR's) placed in series with the line-energized transformer winding. Unfortunately, such solid-state electronic valves exhibit a "holding current" characteristic wherein the valve will remain conductive until current flow therethrough diminishes to some low value, at which time the valve commutates or ceases to conduct. This occurs in spite of the termination of a gating signal to the device. Thus, when a power failure occurs the inherent magnetizing current of the coupling transformer may serve to maintain current flow in the "line" circuit, preventing the solid-state valve from commutating despite the fact that line power has been lost. In theory, it is possible to build a workable commutating circuit for the valve in accordance with known techniques. See, for instance, the SCR Manual, Fifth Edition (1972) published by the General Electric Company at Auburn, New York.

Under normal circumstances, power from a distant AC source 14 is supplied through lines and AC controlling means 12 to a load 10. Main control 18 supplies a GATE signal to the AC controlling means 12. Should the controlling means comprise, for instance, a triac or a pair of opposed SCRs, a continuous GATE signal may be applied to cause the electronic valves to be responsive to the periodic fluctuations in source voltage so as to allow AC current to flow. Line sensing means 16 applies an indication of line voltage to the main control 18. This information is used by the main control as a timing or synchronizing signal for indicating the desired phase when a standby power supply 22 is to be brought on line. A current sensor 20 supplies information to the main control regarding the instantaneous direction and relative magnitude of current flow through the solid-state valve of AC controlling means 12. The maintenance and alarm circuits 28 continue to monitor the status of battery 24 and assure that the battery remains in a fully charged condition.

Upon the occurrence of a fault in power supply 14 an indication thereof is conveyed to the main control by the line sensing means 16. Inasmuch as the line sensing means produces a manifestation of line voltage, it allows the main control to react to a "brownout" situation wherein line voltage has diminished significantly below the normal value. Accordingly, the main control reacts to the presence of either a total failure of or decrease in voltage, or a significant shift in phase of line voltage. The main control then discontinues the gating signal to the AC controlling means, and energizes the standby power supply 22. If the current detector 20 indicates that current above the minimal "holding current" value is flowing in the solid-state valve of AC controlling means 12, this information takes precedence over synchronization and standby supply 22 is energized with a polarity for giving rise to a voltage within the AC controlling means which opposes the flow of current within the solid-state valve. This effects a rapid quenching or commutation of the valve, immediately isolating the standby power supply and the load from the power lines. The commutation of the valve is sensed by the current sensor 20, whereupon the main control 18 causes the standby power supply to operate in synchronism with the voltage previously sensed upon the lines by sensing means 16.

The foregoing activity occurs extremely rapidly, ordinarily in less than 4 milliseconds so that the flow of power to load 10 is substantially uninterrupted. In circumstances wherein the polarity necessary for commutating the valves of the AC control coincides with the normal polarity of line voltage, initiation of standby power supply 22 is in the appropriate polarity and need not be interrupted after commutation of the valve. When the initial polarity which is necessary for commutation does not coincide with the phase of the previously sensed power signal, the period required for commutation and synchronization of the standby power supply is so brief as not to constitute a significant interruption in the continuity of power supplied to the load 10.

Figure 2:
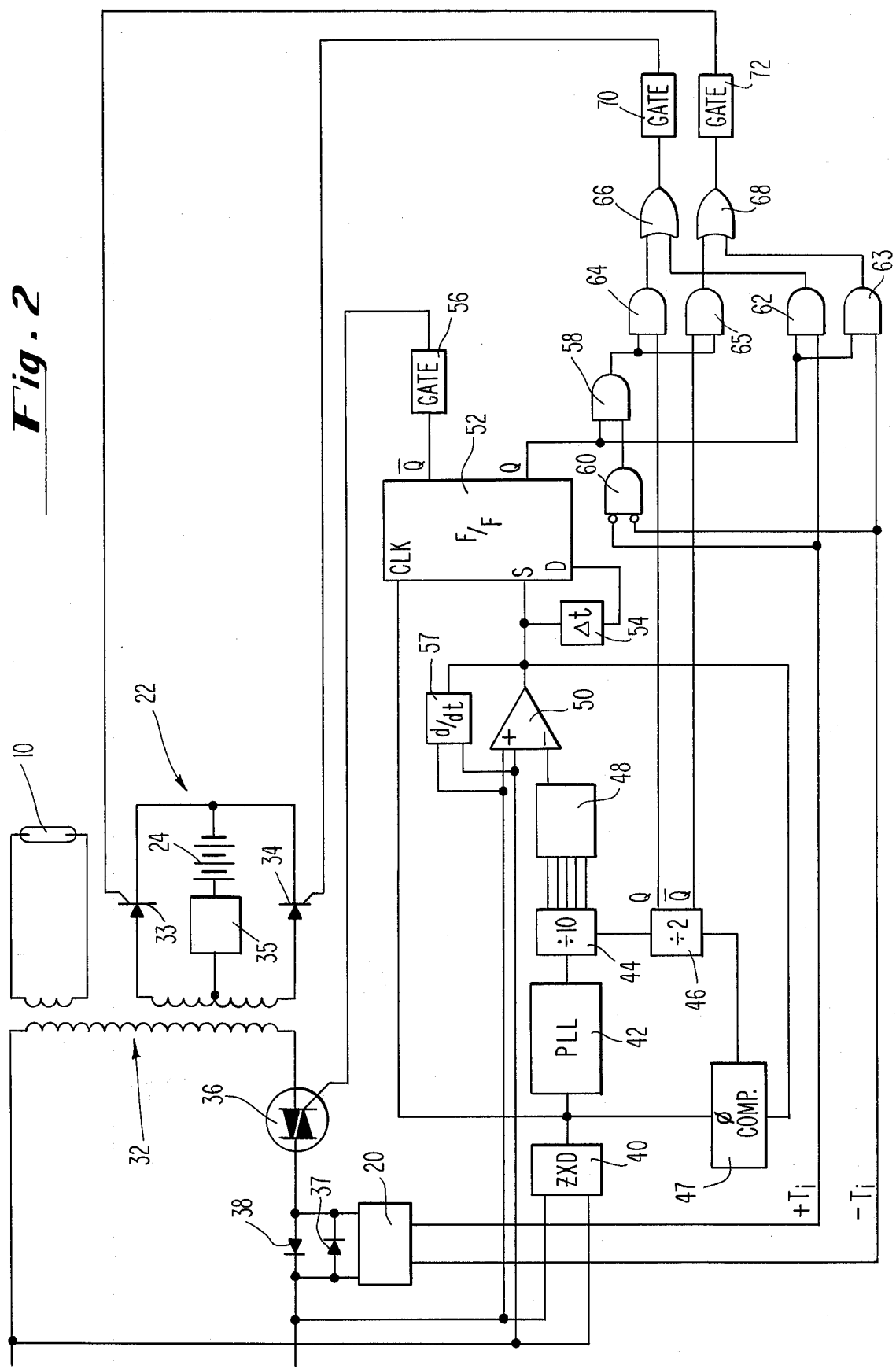
FIG. 2 is a schematic diagram illustrating a presently preferred embodiment of the invention.

Turning now to FIG. 2, there is shown in schematic form a presently preferred embodiment of the invention. A transformer 32 couples load 10 to lines supplying outside power and to a standby power supply 22, herein depicted as an inverter including a pair of SCRs 33, 34. Maintenance and alarm circuitry 35 are provided and function in the manner described with respect to FIG. 1 to monitor the operation and charging of a battery 24.

A solid-state switching element, herein shown as a triac 36, serves to couple a source of AC voltage (not shown) to a winding of transformer 32. The triac serves to decouple the transformer from the lines which supply power to the system from a distant source, thereby isolating load 10 and inverter 22 from the line. The line sensing means 16, herein illustrated in FIG. 2 as a line tap, is coupled to the lines and provides manifestation of line voltage along with phase and frequency information to the system. Current detector 20 is coupled in current-sensing relationship with triac 36 and produces an indication of the sense and relative magnitude of triac current. While detector 20 is depicted as including a pair of opposed diodes 37, 38 across which the voltage drop is monitored, it will be recognized by those skilled in the art that many other approaches are available for monitoring current flow which may be selected as appropriate for a given system.

The line sensing means is coupled to a zero-crossing detector 40. The zero crossing detector comprises timing means which outputs a timing signal to a phase-locked loop 42 for causing the loop to produce a periodic signal in synchronism with line voltage. Inasmuch as zero-crossing detectors are commonly used for timing purposes and for triggering various electronic elements, the specific construction of detector 40 is not depicted. Any appropriate detector may be used, preferably one which outputs a train of square wave pulses whose leading edges coincide with the zero-crossing time of the voltage sensed upon the power supply lines by sensing means 16.

The slew rate of phase-locked loop 42 is such, and its range is so limited, that substantial changes in phase in line voltage will not be traced by the loop. Under normal conditions, however, the loop 42 outputs a signal such that the signal applied to the phase comparator 47 is in synchronism with the line voltage. In the illustrated embodiment an output reference signal at 1200 Hz. is provided to a counting circuit 44 which effectively divides the input frequency by a factor of 10, the divided signal being then applied to a bistable counter 46 which in effect divides the input signal by a factor of 2 and applies it to a phase comparator 47.

Phase-locked loops have long been familiar to circuit designers, and the construction of an appropriate loop is deemed to be well within the skill of the routineer in the art. Accordingly, the specifics of phase-locked loop 42 are not depicted. It is contemplated that an appropriate loop may easily be constructed of discrete components, or one loop may easily be constructed of discrete components, or one of the many commercially available integrated circuit phase-locked loops may be selected for use. A presently preferred embodiment utilizes an integrated circuit marketed by RCA and designated as No. CD4046.

The bistable element 46 may comprise an ordinary flip-flop having a pair of mutually opposed outputs designated Q and $\bar{Q}$. In this manner, element 46 produces a "toggle" signal which changes state twice for every cycle of line voltage. Counter 44, which in a successfully tested embodiment comprised an RCA integrated circuit No. CD4017, includes a series of sequentially-energized output terminals which are coupled to a summing network 48. The summing network comprises a group of appropriately-weighted resistive paths for outputting a signal having a predetermined value for each "count" or output of the counter 44. In this manner a step-wise generated approximation of a sine wave is produced and applied to one input terminal of a comparison means 50, herein depicted as an ordinary comparator.

The comparator 50 then algebraically combines the digitally-generated reference signal produced by summing network 48 with the manifestation of line voltage received from sensing means 16. As long as the line voltage signal exceeds the reference signal, no output is produced by comparator 50. However, should line voltage fail, or should it decline below the value of the reference signal, the comparator will output a transfer signal to the "set" terminal S of a gating control means comprising flip-flop 52.

In order to allow the system to respond to sudden changes in line voltage, the manifestation of line voltage is further applied to a differentiating stage, herein represented at 57. The differentiating stage (which in some applications may be made integral with comparator 50) responds to a sudden change in the line voltage to output a transfer signal to the set terminal of flip-flop 52. The differentiating stage advantageously displays a threshold response so that no transfer signal is given rise to by the normal, periodic fluctuations of the AC line voltage.

The timing of flip-flop 52 is controlled by pulses from zero-crossing detector 40, which are applied to the CLK terminal of the flip-flop. Further, a time delay module 54, which may comprise a simple RC circuit, is coupled between the set and D terminals of the flip-flop to prevent the flip-flop from returning to its original state immediately after the termination of the transfer signal. This precludes the unstable jiggling or oscillating of the standby system in response to repeated perturbations in line voltage.

As was the case with bistable element 46, flip-flop 52 produces a pair of mutually opposed output signals or states designated Q and $\bar{Q}$. One of the signals, herein designated $\bar{Q}$, is processed by a gating circuit 56 and used as a continuous gating signal for triac 36. No particular gating circuit is necessary for the proper functioning of the system, and it is contemplated that an appropriate circuit, such as one of those depicted in the SCR Manual, Fifth Edition, published by the General Electric Company, may be selected as appropriate.

The opposed Q signal, which arises only in the presence of a transfer signal from comparison means 50, is coupled from flip-flop 52 to an AND gate 58 and to a commutating stage which comprises AND gates 62, 63 for producing an enabling signal to allow the energization of SCRs 33, 34 of inverter 22. The other input to AND gate 58 is derived from a second AND gate 60. As is apparent from the illustration, AND gate 60 is provided with inverting input terminals, and accordingly will produce a "1" signal for matching the Q signal when no enabling signals are present at its inputs. This corresponds to a condition wherein no current above holding current value is sensed by current detector 20.

One output of the detector is coupled to one of the inverting inputs of AND gate 60, and to another AND gate 62 of a commutating stage by a line designated $+T_i$ which bears a signal in the presence of "positive" triac current above the holding current value. Similarly, the other inverting input terminal of AND gate 60 is coupled, along with an input terminal of another AND gate 63 of the commutating stage, to a second output of detector 20 by a line which carries information designated $-T_i$, designating "negative" triac current above the holding current value.

The enabling signal from AND gate 58 is coupled to another portion of the synchronizing stage comprising a pair of AND gates 64, 65. The remaining inputs of AND gates 64, 65 are coupled to the Q and $\bar{Q}$ outputs of bistable element 46, respectively. In this manner, when enabled by an output from gate 58, the synchronizing means are caused to "toggle" in synchronism with previously-detected line voltage.

The output terminals of AND gates 62 and 64 are coupled to an OR gate 66 so that either output can be transmitted to a common gate circuit 70 which enables SCR 34. Similarly, the outputs of AND gates 63 and 65 connect to a second OR gate 68 which serves SCR 33 through an appropriate gating circuit 72. Accordingly, the AND gates 64, 65 comprise synchronizing means responsive to signals from the timing circuitry for causing inverter 22 to operate in synchronism with the previously-applied line voltage. AND gates 62, 63 then comprise commutating means responsive to current detector 20 for momentarily overriding the synchronizing means to fire whichever of SCRs 33, 34 necessary to effect the commutation of triac 36.

The operation of the system of FIG. 2 will now be described in detail, making particular reference to the elements shown therein. Initially, it is contemplated that load 10, herein depicted as an HID lamp, is energized by AC voltage appearing across the left-hand winding of transformer 32 and obtained from a distant power source (not shown). Flip-flop 52 produces a continuous gating signal $\bar{Q}$ which allows triac 36 to be enabled, so that AC current flows through the primary unit of transformer 32 and energizes the load. Line sensing means 16 responds to the applied power to produce a line voltage replica signal which is applied both to zero-crossing detector 40 and comparison means 50. Phase-locked loop 42 then outputs a high frequency signal such that the signal applied to the phase comparator 47 is in synchronism with line voltage and, along with counter 44 and summing network 48, comprises a reference means which outputs a stepwise reference voltage to comparator 50. As long as the line voltage replica signal is above the reference value and no abrupt voltages changes occur no transfer signal is produced by the comparator, and flip-flop 52 continues to output a "high" $\bar{Q}$ signal for energizing triac 36.

At the same time, twice every cycle current detector 20 produces a signal indicating a flow of current through triac 36. Depending upon whether the direction of triac current flow is "positive" or "negative," the directions being arbitrarily selected, enabling signals are applied to AND gates 62 or 63, respectively. The signals indicating the presence of a greater-than-holding value current are also applied to one of the inverting inputs of AND gate 60. In this manner AND gate 60 is constrained to output a logical "0" which prevents AND gate 58 from producing an enabling signal to allow the triggering of inverter 22.

Should line voltage diminish, or the line fail entirely, phase-locked loop 42 will continue to run at the frequency at which it has been set but the reference voltage produced by the summing network 48 will exceed the sensed voltage derived by the line sensing means 16. In this event a transfer signal will be outputted by comparator 50 to the set terminal S of flip-flop 52, causing the flip-flop to change state.

In a preferred embodiment the system is also sensitive to an untoward shift in phase of the line voltage, wherein the phase of signals from zero-crossing detector 40 and bistable element 46 are compared by phase comparator 47. If an intolerable discrepancy exists, a transfer signal is outputted by the phase comparator 47 to cause flip-flop 52 to change state. In this manner gating signal $\bar{Q}$ will be removed from the triac gate circuit 56 so that the power lines can be electrically decoupled from the load circuit.

If it were not necessary to maintain a substantially continuous flow of power to a load, the foregoing activity would be all that is necessary as far as decoupling the load from the outside power source was concerned. As the polarity of the AC source changes, the resulting back bias upon the solid-state valve will eventually commutate the valve and open the line. This might, however, require a delay of almost a full half cycle, or approximately 8 milliseconds. Further, and more germane to the subject at hand, the lagging current drawn by an inductive load and/or coupling transformer may substantially prolong the time required for commutation, under some line fault conditions, inasmuch as magnetizing current will continue to flow through the solid-state valve for a considerable period after source voltage has reversed. In some cases the magnetizing current of a transformer could be as high as two amps in a 5,000 watt system. In such a case the time required for magnetizing current to decay below the holding current value is substantially greater than 8 milliseconds. Accordingly, it will be appreciated that it is necessary to devise a means for commutating the solid-state valve in order to isolate the load and standby power source from the faulted supply line. It is for this reason that a commutating system including AND gates 62, 63 and OR gates 66, 68 is provided.

Signals from current detector 20, indicating the presence of current greater than holding current value in triac 36, serve to prevent AND gate 58 from producing an enabling signal despite a digital "1" at the Q output of flip-flop 52. At the same time the digital "1" signal at the Q output of flip-flop 52 is applied to inputs of AND gates 62, 63 and thus serves as an enabling signal which allows either OR gate 66 or OR gate 68 to receive a digital "1" depending upon the direction of sensed current through triac 36. If, for instance, the current flow through triac 36 is in a direction considered "positive" AND gate 62 will become enabled, and pass a digital "1" $+T_i$ signal through OR gate 66 to gating circuit 70. This will enable SCR 34. The latter is poled so as to induce a voltage in the primary winding of transformer 32 which opposes the "positive" current sensed in the triac and commutates the device. In this manner SCR 34 serves to inductively couple a commutating voltage into the source circuit in response to a detected, larger-than-holding value current.

By the same token if current flow through the triac is sensed to be in a "negative" direction a $-T_i$ signal is produced by the current detector. As before, this serves to inhibit synchronizing signals by preventing AND gate 58 from being energized. The $-T_i$ signal is applied to commutating AND gate 63, (enabled due to the state of flip-flop 52) and through OR gate 68 to gating circuit 72. This effects gating of SCR 33, which is poled in the opposite direction to SCR 34. Current flow from inverter 22 then serves to induce a voltage in the source-coupled primary winding of transformer 32 which opposes the previously sensed, negative-going triac current. In the foregoing manner commutation is provided by inverter 22 in response to the presence of current in the solid-state valve.

When the valve 36 is fully commutated transformer 32 is effectively decoupled from the outside power source and the lines extending therefrom. Since current flow has ceased, or has at least fallen below the holding current value, the signals from current detector 20 cease and no further outputs are produced by AND gates 62, 63. Further, the absence of signals from current detector 20 cause inhibiting AND gate 60 to return to a "high" output which, in combination with the "high" output of flip-flop 52 causes AND gate 58 to produce an enabling signal to synchronizing AND gates 64, 65. The output of the latter then commence to toggle in accordance with the operation of bistable means 46 and in this manner effect the alternate firing of SCRs 33 and 34. The latter SCRs will continue to alternate in synchronism with the previously-sensed line voltage due to the continuing oscillatory signal ouputted by phase locked loop 42.

When a properly phased source voltage next appears, comparison means 50 returns to its original state and ceases to apply a transfer signal to flip-flop 52. After the passage of a predetermined period of time, as determined by the value of the components constituting time delay 54, the gating control means reinstates the gating signal to triac 36 at a line voltage zero crossing, and terminates gating signals to the inverter. This is effected by a reversal in state of flip-flop 52 so that the $\overline{Q}$ signal is now "high" while the Q signal is "low." In this manner a continuous gating signal is once again applied to enable triac 36, while at the same time AND gate 58 ceases to produce an enabling signal so that the toggle action of bistable element 46 is no longer applied to gate circuit 70, 72. Finally, since the Q signal of flip-flop 52 has returned to a "low" state, AND gates 62, 63 are disabled so that signals indicating the presence of current through the triac are no longer passed to the SCR gate circuits. It will now be appreciated that the present invention provides a system for rapidly transferring supplied power from an outside voltage supply to a standby supply, such as an inverter, without the need for waiting until current in the source circuit has decayed below a holding current value. The present system thus automatically provides immediate commutation of a valve in the source circuit in order to decouple the source from the load and standby system, and at the same time insures that the standby system will come "on line" in synchronism with the previously-existing supply voltage.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A rapid transfer circuit for disconnecting a load from an AC source including an electronic valve having a predetermined holding current, and supplying power to the load by means of an inverter, comprising:
   line sensing means adapted to be coupled to the AC source for deriving an indication of source voltage;
   timing means coupled to said line sensing means for producing an indication of the phase of source voltage;
   comparison means coupled to said line sensing means for receiving said source voltage indication and responsive thereto to produce a transfer signal in response to a drop in source voltage below a predetermined value;
   an inverter adapted to be coupled to the load for supplying current thereto;
   gating control means coupled to said comparison means and and said timing means and responsive to said transfer signal for selectively enabling the inverter to operate in phase with previously-detected line voltage,
   detector means adapted to be coupled in current-detecting relationship with the electronic valve for producing an indication of the direction of current flow through the valve; and
   commutating means responsive to said indication for inhibiting said gate control means and for enabling said inverter in a phase relationship such as to produce an output of the proper polarity to give rise to a current in the AC source which opposes current through the valve.

2. A transfer circuit according to claim 1, wherein said comparison means comprises means for outputting a transfer signal in response to a change in source voltage occurring at a frequency substantially in excess of the normal frequency of the AC source.

3. A transfer circuit according to claim 1, wherein said timing means comprising a zero-crossing detector.

4. A transfer circuit according to claim 1, further including means for generating a reference signal and applying said reference signal to said comparison means to provide a predetermined voltage for comparison with said indication of source voltage.

5. A transfer circuit according to claim 4, wherein said reference signal is a cyclic voltage which oscillates at the same frequency as the source voltage.

6. A transfer circuit according to claim 5, wherein said means for generating comprises a phase locked loop, counting means coupled to said loop for outputting signals representative of the number of cycles undergone by said loop, and summing means for producing a stepwise cyclic waveform which approximates a sinusoid.

7. A transfer circuit according to claim 6, wherein said means for generating comprises:

means for outputting alternating timing pulses in synchronism with said indication for causing the inverter to operate in synchronism with the AC source.

8. A transfer circuit according to claim 7, wherein said timing means comprises a Zero-crossing detector.

9. A transfer circuit according to claim 8, wherein said means for generating further comprises phase comparing means coupled to said zero-crossing detector and to said phase locked loop for outputting a phase error signal when signals from said zero-crossing detector and said phase locked loop differ in phase by a predetermined amount.

10. A transfer circuit according to claim 9, wherein said comparison means comprises means for outputting a transfer signal in response to a change in source voltage occurring at a frequency substantially in excess of the normal frequency of the AC source.

11. A rapid transfer system for disconnecting a load-energizing AC source and enabling a load-supplying inverter, the source and the inverter being conductively coupled, the source including an electronic valve means of a type requiring a minimum holding current for conduction, said system comprising:
    timing means adapted to be coupled to the AC source for producing a timing signal in synchronism with AC source voltage;
    reference means coupled to said timing means and responsive thereto to produce a periodic reference signal at the same frequency as the AC source voltage;
    sensing means adapted to be coupled to the AC source for outputting a replica of source voltage;
    comparison means coupled to said sensing means and said reference means for producing a transfer signal in response to a decline in AC source voltage below predetermined values with respect to said reference signal;
    gating control means coupled to said comparison means and said timing means and responsive to said transfer signal to apply a gating signal to the inverter;
    a current detector for outputting an indication of current flow above a holding current value, and the direction of said current flow;
    synchronizing means coupled to said timing means and said gating control means for causing the inverter to operate in synchronism with a previously-sensed AC source voltage subsequent to the diminution of said sensed current beneath a holding current value; and
    commutating means coupled to said current detector and responsive to said current indication for causing the inverter to initially produce an output of the proper polarity to give rise to a voltage in the AC source which opposes the current sensed therein.

12. A transfer circuit according to claim 11 wherein said comparison means comprises means for outputting a transfer signal in response to a change in source voltage occurring at a frequency substantially in excess of the normal frequency of the AC source.

13. A system according to claim 11, further including time delay means coupled to said comparison means to prevent deenergization of the inverter for a predetermined period after the AC source voltage has returned to a value above said predetermined value.

14. A system according to claim 13, further including means for inhibiting said synchronizing means while said sensed current exceeds said holding current.

15. A system according to claim 14, wherein said timing means comprises a zero-crossing detector.

16. A system according to claim 11, wherein said reference means comprises a phase locked loop, counting means, and summing means, said counting means and summing means being coupled to said phase locked loop for generating a stepwise analog of a sine wave.

17. A system according to claim 16, further including bistable means coupled to said phase locked loop for outputting a toggle signal in synchronism with previously-sensed source voltage to provide a synchronous gating signal to the inverter.

18. A system according to claim 16, further including phase comparison means coupled to said phase locked loop and said zero-crossing detector for outputting a transfer signal when the phase of signals in said loop and the phase of the AC source voltage differ by a predetermined amount.

19. A transfer circuit for providing power to a high intensity discharge lamp and transferring lamp-supplying power to said lamp in a period less than that required for the quenching of the high intensity discharge lamp, including:
    a source circuit including a solid state gated valve requiring a minimum holding current for conduction;
    a battery-powered inverter including solid-state gated switch means for determining the phase of the inverter output;
    a current detector coupled in circuit with said solid-state gated valve for producing an indication of current flow therethrough;
    line sensing means coupled to said source circuit for providing a representation of source voltage;
    a zero-crossing detector coupled to said sensing means for outputting a timing signal;
    a phase locked loop coupled to said zero crossing detector for producing a periodic signal in synchronism with source voltage;
    digital means coupled to said phase locked loop and responsive to said periodic signal for providing a periodic reference signal;
    comparison means coupled to said line sensing means and said digital means for producing a transfer signal when the difference between said representation and said reference signal exceeds a predetermined value;
    counting means coupled to said phase locked loop for outputting alternating signals at the same nominal frequency as that of the source voltage;
    bistable means coupled to said zero crossing detector and to said comparison means for outputting a gate signal for said solid-state gated valve in one mode, and an inverter enable signal in the other mode;
    inhibit means coupled to said current sensing means for inhibiting said inverter enable signal in response to current flow through said solid-state gated valve above the holding current value;
    synchronizing means coupled to said bistable means and to said counting means for selectively energizing said solid-state switch means of said inverter to produce a voltage occurring in synchronism with previously-sensed source voltage; and
    commutating means coupled to said current detector and said bistable means for selectively energizing said solid-state switch means of said inverter to produce a voltage in said source circuit which opposes current flowing therein regardless of the operation of said synchronizing means, and subsequent to the diminution of said current beneath said minimum holding value allows said inverter to be operated by said synchronising means.

20. A transfer circuit according to claim 19, wherein said comparison means is further operative to produce a transfer signal when said reference signal exhibits an abrupt change at a rate in excess of a predetermined, threshold rate.

* * * * *